United States Patent [19]
Hogan et al.

[11] Patent Number: 5,998,569
[45] Date of Patent: Dec. 7, 1999

[54] ENVIRONMENTALLY STABLE OPTICAL FILTER MATERIALS

[75] Inventors: Dennis P. Hogan, Jericho; Harold G. Linde, Richmond, both of Vt.

[73] Assignee: International Business Machines Corporation, Armonk, N.Y.

[21] Appl. No.: 09/042,655

[22] Filed: Mar. 17, 1998

[51] Int. Cl.$^6$ .......................... C08G 73/00; G03C 1/492; G03C 1/725
[52] U.S. Cl. .......................... 528/310; 528/170; 528/322; 528/327; 528/350; 528/352; 528/353; 430/272; 430/283; 430/286; 430/326; 438/3; 438/7
[58] Field of Search .................................... 528/353, 350, 528/352, 322, 310, 170, 327; 430/286, 283, 272, 326; 438/3, 7

[56] References Cited

U.S. PATENT DOCUMENTS

| | | | |
|---|---|---|---|
| 4,054,906 | 10/1977 | Yamanaka | 358/43 |
| 4,059,839 | 11/1977 | Yamanaka et al. | 358/44 |
| 4,126,466 | 11/1978 | Roos | 96/84 UV |
| 4,268,601 | 5/1981 | Namiki et al. | 430/159 |
| 4,465,767 | 8/1984 | Oba et al. | 430/271 |
| 4,495,516 | 1/1985 | Moore et al. | 358/54 |
| 4,663,656 | 5/1987 | Elabd et al. | 358/75 |
| 4,782,009 | 11/1988 | Bolon et al. | 430/326 |
| 4,910,122 | 3/1990 | Arnold et al. | 430/313 |
| 4,985,758 | 1/1991 | Hashimoto | 358/44 |
| 5,159,037 | 10/1992 | Clement et al. | 526/242 |
| 5,159,038 | 10/1992 | Babb et al. | 526/242 |
| 5,162,468 | 11/1992 | Babb et al. | 526/242 |
| 5,182,040 | 1/1993 | Bartlett et al. | 252/67 |
| 5,210,265 | 5/1993 | Clement et al. | 558/230 |
| 5,310,625 | 5/1994 | Angelopoulos et al. | 430/325 |
| 5,338,826 | 8/1994 | St. Clair et al. | 528/353 |
| 5,359,092 | 10/1994 | Hay et al. | 546/99 |

OTHER PUBLICATIONS

"New Memory Systems Constructed with Polyimide LB Films Having Azobenzene Pendant Groups: Behavior of In–Plane Anisotropic Photoisomerization, Photoinduced Optical Anisotropy, and Anisotropic Photofading", S. Yokoyama, M. Kakimoto, Y. Imai, *Mol. Cryst. Liq. Cryst.* 1993 vol. 227, pp. 295–307.

"Photochemically Inducible and Erasable Dichroism by Molecular Reorientation of an Azobenzene Pendant Unit in a Polyimide Langmuir–Blodgett Film", S. Yokoyama, M. Kakimoto, Y. Imai, *Langmuir*, 1994 vol. 10, No. 12, pp. 4594–4598.

"Various Orientations of Pendant Dye Attached to Polyamic Acid Langmuir and Langmuir–Blodgett Films Studied by an Optical Second–Harmonic Generation Interferometry Technique", T. Tamada, et al., *Thin Solid Films*, 244 (1994) pp. 754–757.

"Displacement Current Generation Across Single Monolayers of Polyamic Acids Having Pendant Groups at the Air––Water Interface", H. Naruse, et al., *Thin Solid Films*, 242 (1994) pp. 220–222.

"Novel Synthesis of Polymide with Pendant 1–Phenylethyl Ester Using DBU and its Thermal Acid–Catalyzed Deesterification", T. Iizawa, T. Ogasa, *Journal of Polymer Science: Part A: Polymer Chemistry*, vol. 34 (1996) pp. 63–71.

"Surface Structure and Orientation of Polyamic Acid Alkylamine Salt Langmuir–Blodgett Films Having an Azobenzene Pendant Unit", S. Yokoyama, et al., *Thin Solid Films*, 273 (1996) pp. 254–257.

"Photochemical Memory System in Polyimide Langmuir––Blodgett Film with Azobenzene Pendant Group", S. Yokoyama, M. Kakimoto, Y. Imai, *Thin Solid Films*, 242 (1994) pp. 183–186.

*Primary Examiner*—P. Hampton-Hightower
*Attorney, Agent, or Firm*—Delio & Peterson LLC; John J. Tomaszewski; James M. Leas

[57] ABSTRACT

A composition of matter comprising a polyamic acid/ester having an amide pendant group directly substituting an acid site of the polyamic acid is provided, which composition when cured provides a colored polymer film when the amide group is a chromophore. The resulting polymer which may be applied as a film to semiconductor chips to provide an optically sensitive semiconductor chip comprises a partially imidized polyamic acid wherein an amide pendant group is directly attached to one acid moiety of the polyamic acid and the other acid group imidized with the adjacent amino group of the polyamic acid. The polymers are useful as optical filters on semiconductor chips and for photoresist applications.

16 Claims, No Drawings

ENVIRONMENTALLY STABLE OPTICAL FILTER MATERIALS

BACKGROUND OF THE INVENTION

1. Field of the Invention

This invention relates generally to environmentally stable optical filter materials and, in particular, to polymers which may be used as optical-filter media on semiconductor devices for the transfer and printing of color images. The optical filter materials are highly temperature stable and incorporate chromophores yielding a variety of colors which can be used in combination to create colored patterns. The polymers may also be used as antireflective layers in the fabrication of semiconductor devices using photolithography.

2. Description of Related Art

Optical-filter media such as dyed gelatin or resist layers are used as layers on semiconductor devices for the transfer and printing of color images. Typically, photoresists, containing labile dye compounds, are imaged to form colored patterns over a semiconductor substrate. These layers filter optical energy to the semiconductor surface, such as a charge coupled device; however, the layers lack a robust character and degrade on environmental exposure. Furthermore, manufacture of such devices with resist films require long bake times and frequently encounter solvent incompatibilities between overlying or underlying layers of resists in laminated structures. Additionally, resist striations can occur which impede uniformity of the product film.

A number of patents have issued using color filters with charge coupled devices and other devices in solid state color cameras, film video players, signal processing systems and the like. Exemplary U.S. patents in which the present invention are useful include U.S. Pat. Nos. 4,054,906; 4,059,839; 4,495,516; 4,663,656; and 4,985,758, the disclosures of which are incorporated herein by reference.

In the fabrication of integrated circuits, a photosensitive polymer film is applied to the silicon wafer, dried, and then exposed through a photomask to ultraviolet light or other radiation with the proper geometrical patterns. After exposure, the wafer is soaked in a solution that develops the images in the photosensitive material. Depending upon the type of polymer used, either exposed or nonexposed areas of the film are removed in the developing process.

A frequent problem encountered in such photolithographic processes to fabricate semiconductor devices is reflectivity back into the resist of the activating radiation by the substrate, especially those containing highly reflecting topographies. Such reflectivity tends to cause standing wave ripples and reflective notches which interfere with the desired pattern in the photoresist. To minimize this problem, chromophores have been introduced into the photoresist materials or in the underlying layers so that the photoresist or the underlying layer absorbs additional radiation upon exposure during the patterning process. Polyimides have been used with chromophores to provide such an antireflective underlying layer.

It is also common knowledge in the art to apply a photoresist layer over a polyamic acid film layer, expose the films to actinic radiation through an image defining mask, and simultaneously develop and etch the films in a basic aqueous solution to create an image in the amic acid film.

Bearing in mind the problems and deficiencies of the prior art, it is therefore an object of the present invention to provide an optically sensitive, preferably high temperature resistant, polymer which may be used as an optical-filter media on semiconductor chips and other substrates and in the fabrication of integrated circuit devices.

It is a further object of the present invention to provide a composition of matter which is curable to form an environmentally stable highly temperature resistant optical filter polymeric film.

It is another object of the present invention to provide a method for the fabrication of semiconductor chips, optical-filter media or other substrates requiring a highly temperature stable film which absorbs light radiation.

Other objects and advantages of the present invention will in part be obvious and will in part be apparent from the specification.

SUMMARY OF THE INVENTION

The above and other objects and advantages, which will be apparent to one of skill in the art, are achieved in the present invention which is directed, in a first aspect, to a curable composition of matter comprising a polyamic acid having an amide pendant group directly substituting an acid site of the polyamic acid. In a preferred embodiment the amide is a chromophore and in a more preferred aspect, the chromophore is a compound having the formula:

wherein $R_1$ and $R_2$ are independently selected from the group consisting of hydrogen, anthraquinone, acridine, acridone, phenanthridine, phenanthrene, pyridine, anthracene, chrysene, fluorene, pteridine, and fluoranthene, which compounds are substituted and unsubstituted, with the proviso that $R_1$ and $R_2$ cannot both be hydrogen. The hydrogen atom of the chromophore of formula I is eliminated in a condensation reaction of the amine group with the carboxylic group of the polyamic acid polymer chain so that the chromophore is attached to the chain via a carbonyl group forming the amide moiety. The chromophore may impart a wide range of colors such as red, green, blue, gray, etc.

In a further aspect of the invention, an optically sensitive semiconductor chip containing a colored film is provided comprising a partially imidized polyamic acid wherein amide pendant groups are directly attached to some acid sites of the polyamic acid and the other acid groups are imidized with the adjacent amido group of the polyamic acid (to form a polydiamide imide). In a preferred aspect, the amide pendant group is a chromophore and more preferred, is compound I defined hereinabove.

In an additional aspect of the invention, the optically sensitive semiconductor chip contains a plurality of colored films which films are preferably layered. In another aspect of the invention each film layer comprises a polymer containing a different pendant chromophore.

DESCRIPTION OF THE PREFERRED EMBODIMENTS

The present invention relates to polymers derived from polyamic acids or polyamic esters wherein the polyamic acid has an amide pendant group directly attached to an acid site of the polyamic acid. The amide pendant group is preferably a chromophore to impart colored properties to the polyamic acid and to the polymer produced upon curing of the polyamic acid.

Suitable polyamic acids and the resultant cured polymer product may be demonstrated by the following processes:

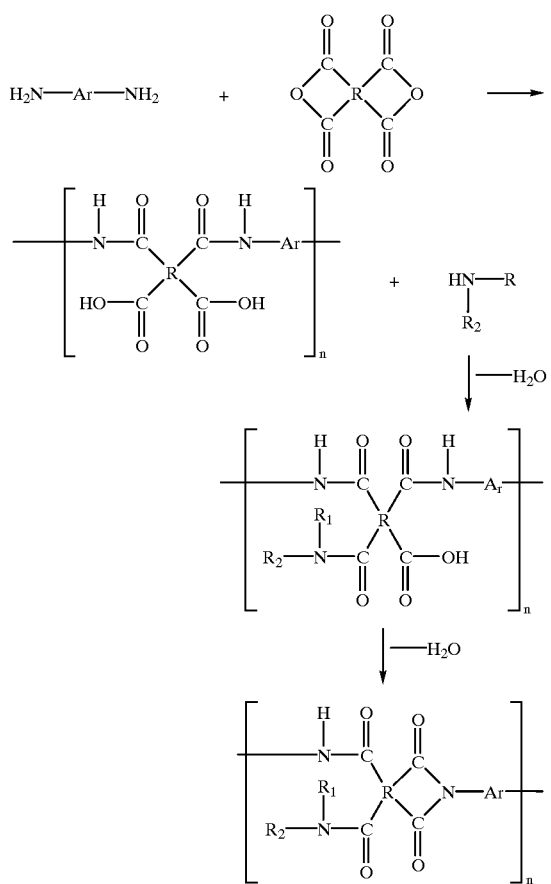

wherein Ar is selected from alkyl or aryl and optionally substituted with suitable substituents which do not interfere with the imidization nor the final properties of the polymer product;

wherein R is a tetravalent organic radical selected from cycloalkyl, aromatic and aromatic heterocyclic, wherein the aromatic generally has at least 6 carbon atoms characterized by benzenoid unsaturation and the four valencies are fixed by pairs on separate adjacent carbon atoms; and wherein $R_1$ and $R_2$ are independently selected from the group consisting of hydrogen, anthraquinone, acridine, acridone, phenanthridine, phenanthrene, pyridine, anthracene, chrysene, fluorene, pteridine, and fluoranthene, which compounds are substituted and unsubstituted, with the proviso that the $R_1$ and $R_2$ cannot both be hydrogen.

Preferably, Ar comprises a monocyclic or polycyclic divalent aromatic radical in which the aromatic rings may be aromatic, heterocyclic or directly attached rings, e.g. biphenylene or naphthalene. Exemplary Ar include:

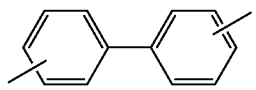 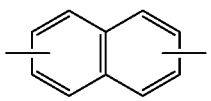

-continued

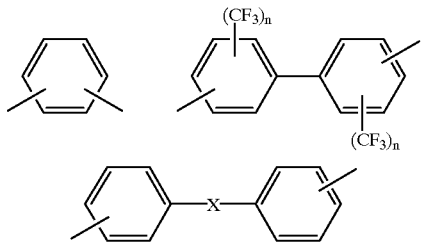

wherein X is selected from the group consisting of an alkylene chain having 1–3 carbon or halocarbon atoms, carbonyl, —O—, —S—, —SO$_2$— and —N— alkyl. The aromatic radical can optionally be substituted by a variety of substituents such as alkyl, haloalkyl (trifluoromethyl) halo or the like. Suitable Ar include:

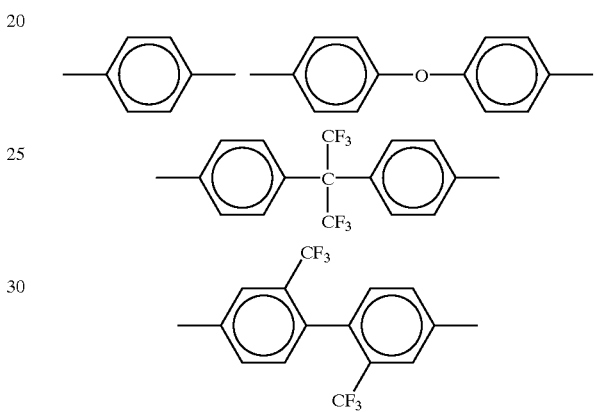

Suitable R groups generally comprise tetravalent organic radicals selected from cycloalkyl, aromatic and aromatic heterocyclic, wherein the aromatic generally has at least 6 carbon atoms characterized by benzenoid unsaturation and the four valencies are fixed by pairs on separate adjacent carbon atoms. When the aromatic radical comprises several rings connected together, the linking elements are for example a single bond or one of the following atoms or groups:

—O—; —S—; —SO—; —SO$_2$—; —CO—
—CHOH—; —CH$_2$—; —CF$_2$—, —C(CH$_3$)$_2$—;
—C(CF$_3$)$_2$—; —COO—; —CONH—;
—CO—O—(CH$_2$)$_x$—O—CO—; —Si(CH$_3$)$_2$—;
—O—Si(CH$_3$)$_2$—O—.

Suitable R groups include the following:

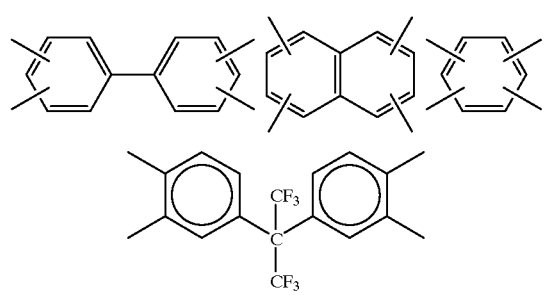

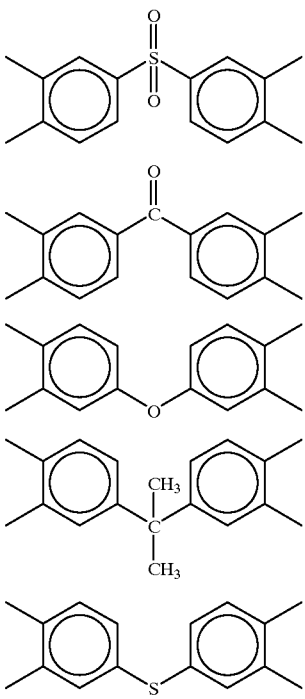

Other suitable R groups will be known to those skilled in the Art. R may also be substituted with a variety of substituents known to those skilled in the art which do not interfere with the imidization nor the final properties of the polyimide.

Amic acid esters may be used, such as alkyl or aryl esters or mixed amic acid-amic acid ester compounds or blends.

Suitable amino compounds of formula I include:

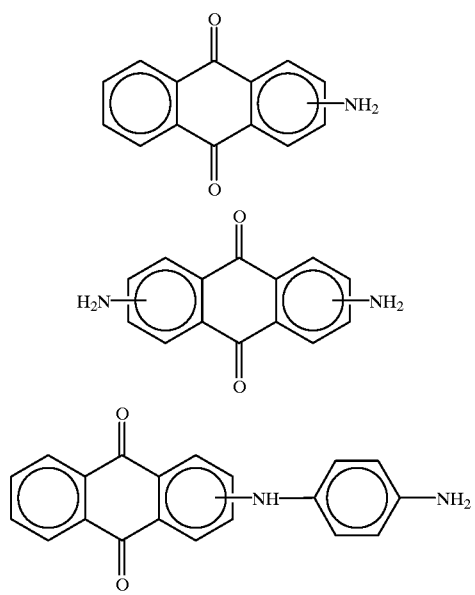

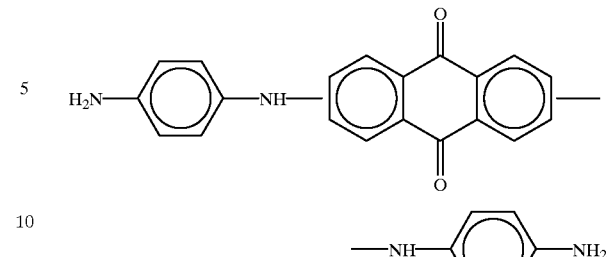

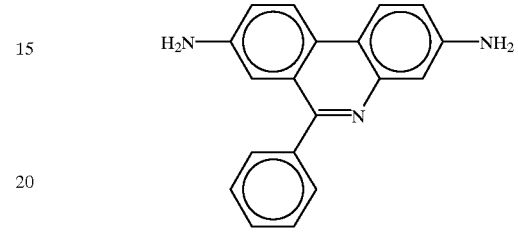

(Solvent Green 3)

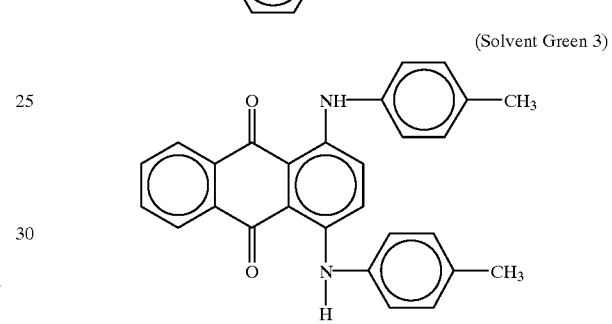

(Solvent Green 59)

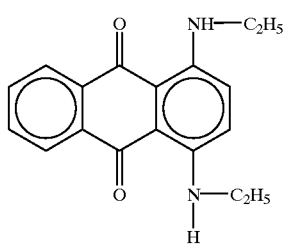

(Disperse Blue 1)

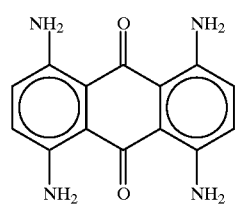

(Disperse Orange II)

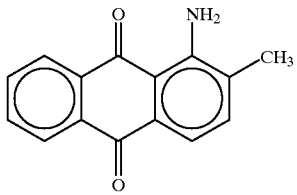

(Acidine Yellow G)

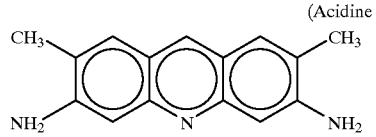

-continued

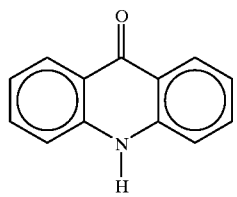

(9 (10H) Acridine)

As shown hereinabove, a polyamic acid is formed by reacting a diamine with a dianhydride. The polyamic acid is then reacted with the amino compound represented by the formula $HNR_1R_2$ to form a polyamic acid in which one of the acid groups is reacted with the amine compound to form a pendant amide group. The amide containing polyamic acid is then reacted to imidize the remaining acid groups forming the final polymer product which may be broadly characterized as a polydiamide imide.

The above reaction steps to form the polyamic acid, and the polyamide polyamic acid and polyamide imide may be formed using conventional process steps.

Various embodiments of the present invention will now be illustrated by reference to the following specific examples. It is to be understood, however, that such examples are presented for purposes of illustration only, and the present invention is in no way to be deemed as limited thereby.

A nominal 16.5% pyromellitic dianhydride-oxydianiline (PMDA-ODA) polyamic acid solution in N-methylpyrrolidinone (NMP) sold by DuPont as Product 5878HP, was combined with a reactive chromophore of the formula $HNR_1R_2$ as indicated in the Table. The mixture was mixed overnight on a roller mill to effect solution and permit reaction of the amino chromophore group with the amic acid to form a reaction product such as a carboxylate salt or an amide.

The solutions were spin applied to quartz wafers using conventional methods. Spin speeds were about 3,000 rpm and the resulting film thickness was about 5–10 microns. The coated wafers were baked for 30 minutes at 350° C. in a nitrogen purged oven to cure the amic acid films and fully form the pendant amide chromophore linkages.

TABLE

| CHROMOPHORE (g) 5878HP(g) | Initial Color | Color After Bake | Absorbance |
|---|---|---|---|
| 1,4-diaminoanthraquinone (.26) (54.98) | Purple | Purple | 0.55 @ 556 nm |
| 1,5-diaminoanthraquinone (.25) (54.85) | Orange | Orange | 0.57 @ 490 nm |
| Solvent Green 3 (.25) (63.53) | Green | Green | 0.41 at 652 nm |
| Solvent Blue 59 (.27) (69.65) | Blue | Gray | 0.33 @ 580 nm |

The resulting films were durable, transparent, colored coatings.

When the amine chromophore is a diamine, a cross-linked polymer product will be obtained as will be apparent to those skilled in the art. This is demonstrated in the above process sequence wherein a diaminoanthraquinone is used.

Colored cured polydiamide imide films may be prepared using a number of procedures for use as high temperature optical filter coatings. While not limited to this method, the polymer films may be prepared by adding anthraquinonediamine-polyimide precursors (or other such precursors) to an imageable polyamic acid, applying a suitable overlying photoresist layer, exposing and developing the image, removing the resist and then curing the polyamic acid mixture. Resulting films are stable color filters that can be dyed to almost any color, or used in combination to create colored patterns.

Alternatively, the polyamic acid film can be applied and imaged, the overlying resist stripped, and the imaged film contacted with a solution of the dye material and incorporated. In this case, excess dye is rinsed from the amic acid structure prior to thermal curing to the amide-imide.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An optically sensitive semiconductor chip comprising a chip having a film thereon comprising a polydiamide imide having the formula:

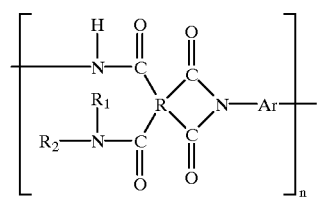

wherein Ar is selected from alkyl or aryl and optionally substituted with substituents;

wherein R is a tetravalent organic radical selected from cycloalkyl, aromatic and aromatic heterocyclic, wherein the aromatic has at least 6 carbon atoms and benzenoid unsaturation and the four valencies have pairs on separate adjacent carbon atoms; and wherein $R_1$ and $R_2$ are independently selected from the group consisting of hydrogen, anthraquinone, acridine, acridone, phenanthridine, phenanthrene, pyridine, anthracene, chrysene, fluorene, pteridine, and fluoranthene, which compounds are substituted and unsubstituted, with the proviso that the $R_1$ and $R_2$ cannot both be hydrogen.

2. The optically sensitive chip of claim 1 wherein the polydiamide-imide contains a pendant amide chromophore.

3. The optically sensitive chip of claim 1 wherein the chromophore is compound having the formula:

(I)

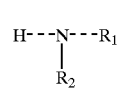

wherein $R_1$ and $R_2$ are as defined above.

4. The optically sensitive chip of claim 1 further comprising a plurality of colored polydiamide imide films.

5. The optically sensitive chip of claim 4 wherein the films are layered.

6. The optically sensitive chip of claim 1 wherein the film is thermally stable.

7. A polydiamide-imide having the formula:

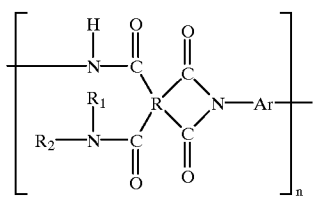

wherein Ar is selected from alkyl or aryl and optionally substituted with substituents;

wherein R is a tetravalent organic radical selected from cycloalkyl, aromatic and aromatic heterocyclic, wherein the aromatic has at least 6 carbon atoms and benzenoid unsaturation and the four valencies have pairs on separate adjacent carbon atoms; and wherein $R_1$ and $R_2$ are independently selected from the group consisting of hydrogen, anthraquinone, acridine, acridone, phenanthridine, phenanthrene, pyridine, anthracene, chrysene, fluorene, pteridine, and fluoranthene, which compounds are substituted and unsubstituted, with the proviso that the $R_1$ and $R_2$ cannot both be hydrogen.

8. The polydiamide-imide of claim 7 wherein the polydiamide-imide contains a pendant amide chromophore.

9. The polydiamide-imide of claim 8 wherein the chromophore is compound having the formula:

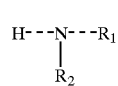 (I)

wherein $R_1$ and $R_2$ are as defined above.

10. A method for forming the polydiamide-imide of claim 7 comprising:
reacting a diamine with a dianhydride to form a polyamic acid;
reacting the polyamic acid with an amino compound represented by the formula $HNR_1R_2$ to form a polyamic acid in which one of the acid groups is reacted with the amino compound to form a pendant amide group; and
reacting the amide containing polyamic acid to imidize the remaining acid groups forming the polydiamide-imide product.

11. A curable composition of matter comprising a polyamic acid having an amide pendant group directly substituting acid sites of the polyamic acid and other acid sites being imidizable to form a polydiamide imide having the formula:

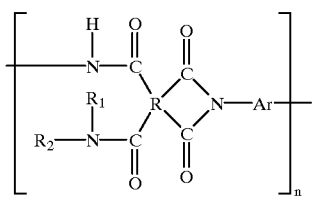

wherein Ar is selected from alkyl or aryl and optionally substituted with substituents;

wherein R is a tetravalent organic radical selected from cycloalkyl, aromatic and aromatic heterocyclic, wherein the aromatic has at least 6 carbon atoms and benzenoid unsaturation and the four valencies have pairs on separate adjacent carbon atoms; and wherein $R_1$ and $R_2$ are independently selected from the group consisting of hydrogen, anthraquinone, acridine, acridone, phenanthridine, phenanthrene, pyridine, anthracene, chrysene, fluorene, pteridine, and fluoranthene, which compounds are substituted and unsubstituted, with the proviso that the $R_1$ and $R_2$ cannot both be hydrogen.

12. The composition of claim 11 wherein the amide is a chromophore.

13. The composition of claim 11 wherein the amide is a chromophore imparting a color of red, green, blue or gray.

14. The composition of claim 12 wherein the chromophore is compound having the formula:

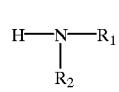 (I)

wherein $R_1$ and $R_2$ are independently selected from the group consisting of hydrogen, anthraquinone, acridine, acridone, phenanthridine, phenanthrene, pyridine, anthracene, chrysene, fluorene, pteridine, and fluoranthene, which compounds are substituted and unsubstituted, with the proviso that $R_1$ and $R_2$ can not both be hydrogen.

15. The polydiamide-imide polymer made by thermally curing the curable composition of claim 11.

16. The polyiamide-imide polymer made by thermally curing the curable composition of claim 14.

* * * * *

UNITED STATES PATENT AND TRADEMARK OFFICE
CERTIFICATE OF CORRECTION

PATENT NO. : 5,998,569
DATED : December 7, 1999
INVENTOR(S) : Hogan et al.

It is certified that error appears in the above-identified patent and that said Letters Patent is hereby corrected as shown below:

Column 6, line 34 delete "(Solvent Green 59)" and substitute therefor - - (Solvent Blue 59) - - .

Signed and Sealed this

Eighteenth Day of July, 2000

Attest:

Q. TODD DICKINSON

Attesting Officer       Director of Patents and Trademarks